Oct. 13, 1931.  A. L. HARRINGTON  1,827,469
GLASS MELTING APPARATUS
Filed Feb. 28, 1930  4 Sheets-Sheet 1
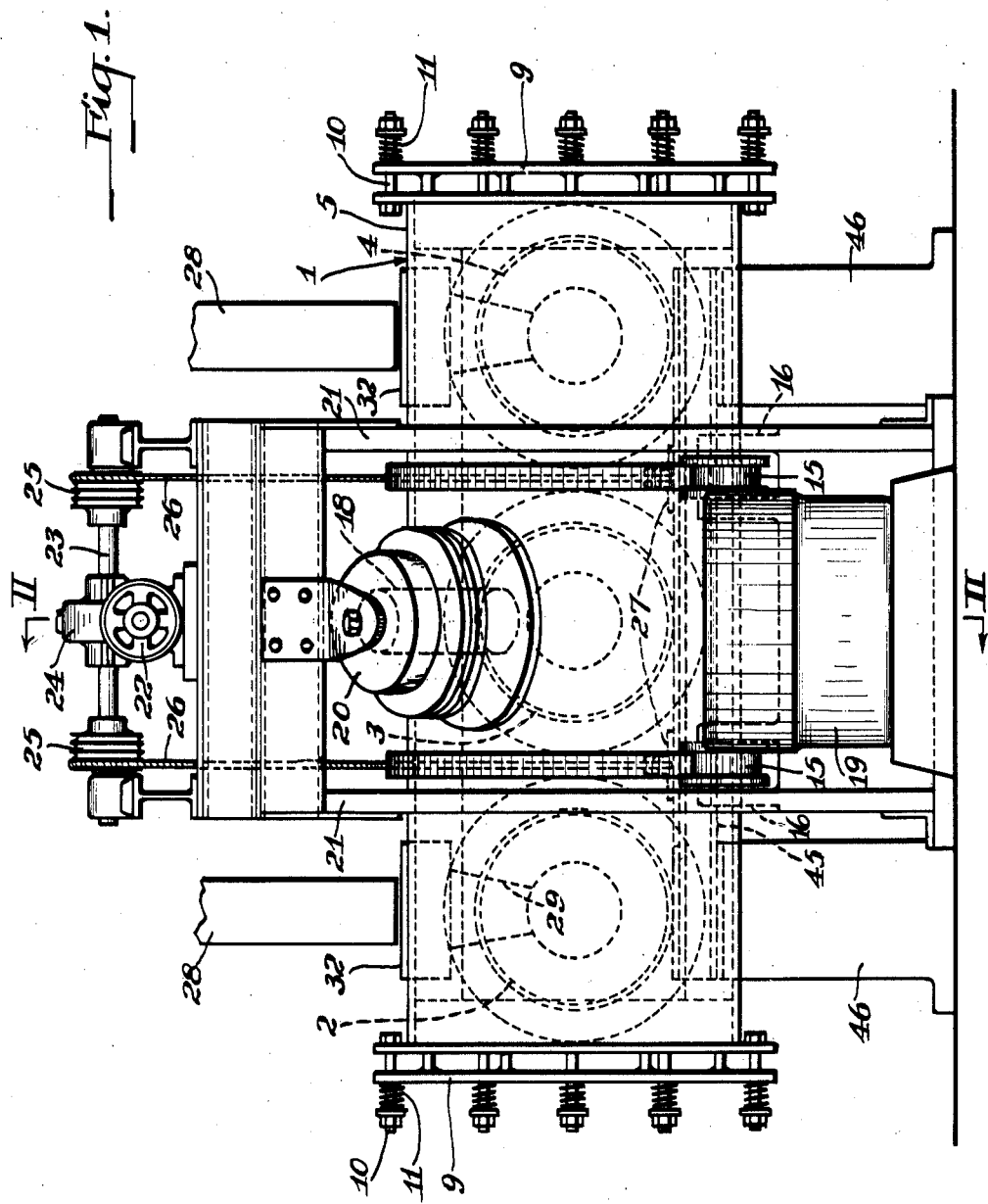
INVENTOR
Alfred L. Harrington
by James L. Bradley
atty

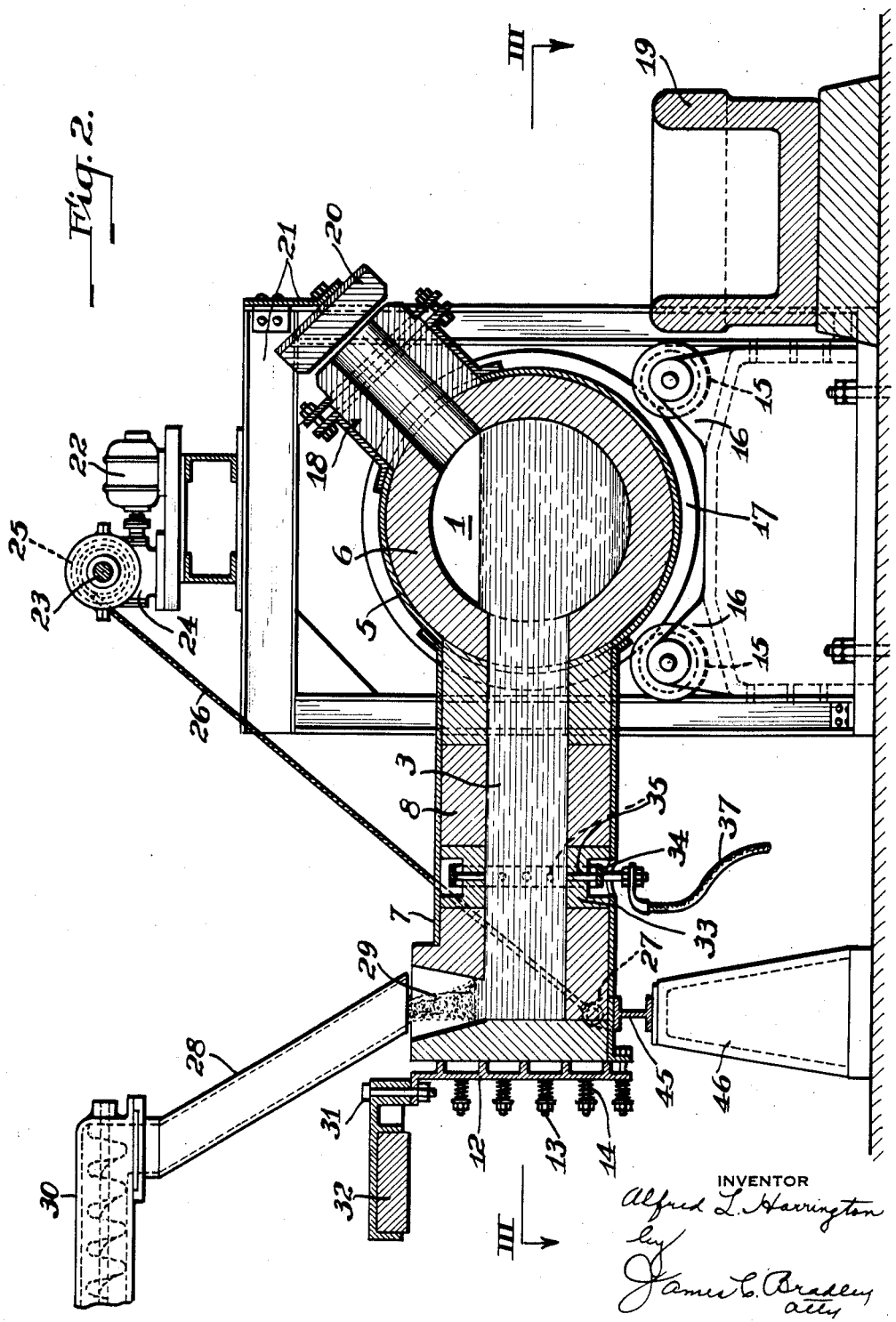

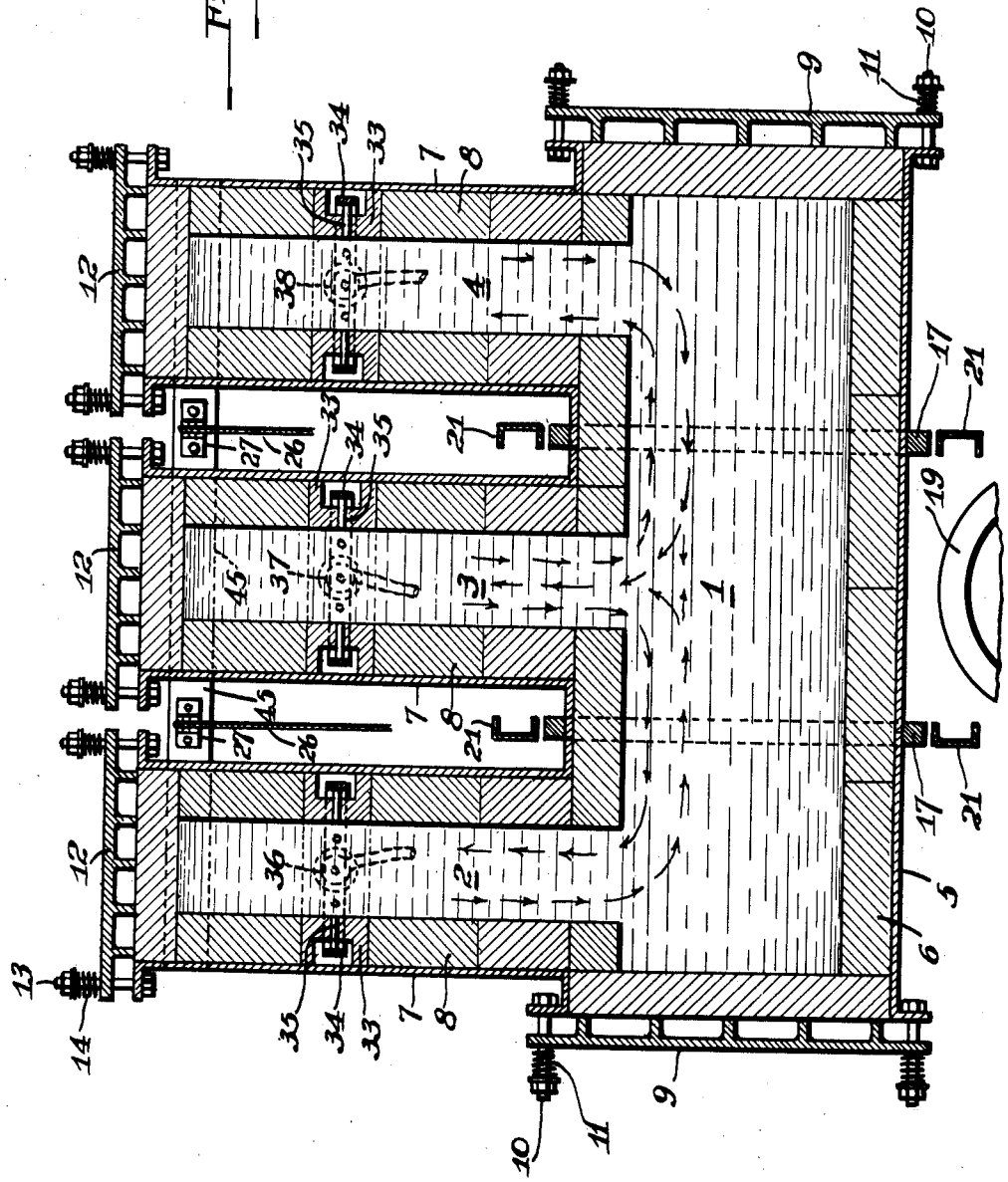

Oct. 13, 1931. A. L. HARRINGTON 1,827,469
GLASS MELTING APPARATUS
Filed Feb. 28, 1930 4 Sheets-Sheet 4
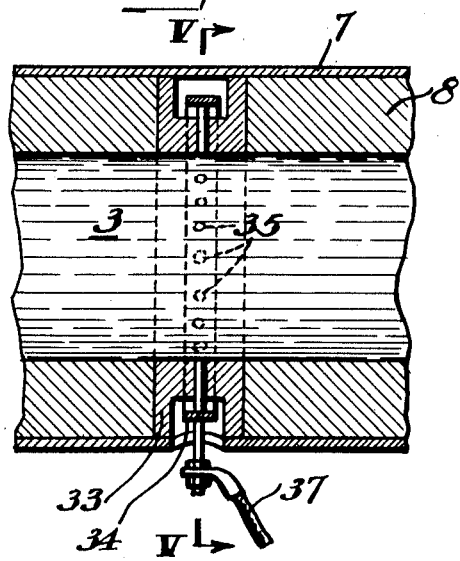
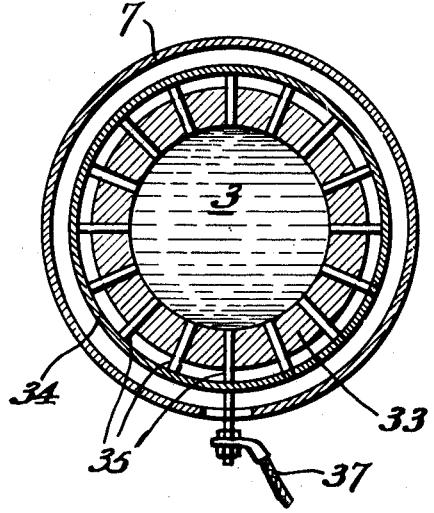
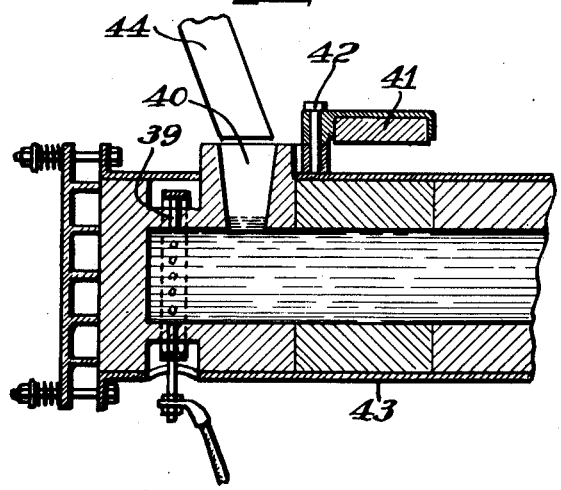

Patented Oct. 13, 1931

1,827,469

UNITED STATES PATENT OFFICE

ALFRED L. HARRINGTON, OF ROSSLYN FARMS, PENNSYLVANIA, ASSIGNOR TO PITTSBURGH PLATE GLASS COMPANY, A CORPORATION OF PENNSYLVANIA

GLASS MELTING APPARATUS

Application filed February 28, 1930. Serial No. 432,071.

The invention relates to apparatus for melting glass by electricity and is designed particularly for melting glass to be used in the manufacture of plate glass. The apparatus is intended to melt the batch and supply it to the usual pots employed in the manufacture of plate glass, such pots then being placed in the pot furnace and subjected to the usual refining operation extending over a period of several hours. The preliminary reduction of the batch to a molten condition in the electric furnace may be accomplished very rapidly, and cuts down the time subsequently required to bring the glass to casting condition in the pot furnace. The invention has for its objects the provision of an improved form of electric furnace of cheap, simple construction adapted to reduce the batch rapidly and substantially continuously and discharge it intermittently to the glass pots. A further object is to provide a furnace having an improved arrangement for securing the intermittent discharge of the glass. Other objects are the provision of improved electrodes which will have long life in service and will not discolor the glass, and the provision of means for keeping the joints between the refractory parts of the lining, which lie inside the metal lining, tight. Certain embodiments of the invention are illustrated in the accompanying drawings, wherein:

Figure 1 is a front elevation of the apparatus. Fig. 2 is a section on the line II—II of Fig. 1. Fig. 3 is a section on the line III—III of Fig. 2. Fig. 4 is a longitudinal section through a portion of one of the melting sections of the furnace. Fig. 5 is a section on the line V—V of Fig. 4. And Fig. 6 is a section through the rear end of a modified form of furnace melting section.

The furnace comprises a cylindrical collecting tank 1 and three melting or reducing chambers 2, 3 and 4, also cylindrical in cross section, and leading through the side wall of the tank 1. The tank 1 comprises a metal shell 5 provided with a refractory lining 6, and the chambers 2, 3 and 4 each comprise a metal shell 7 with the refractory lining 8. At each end of the tank 1 is a ribbed metal plate 9 supported from the casing 5 by a series of bolts 10 and pressed yieldingly against the refractory lining at the ends of the tanks by means of the springs 11 which surround the bolts 10. As the lining of the tank is necessarily made in several parts or sections, the spring pressed plates 9 serve to place the lining under compression to make the joints tight, thus giving better protection to the shell 5. A similar expedient is applied at the ends of the shells 7, the plates 12 being supported from the shell or casing 7 by means of the bolts 13 and being spring pressed against the linings of the chambers by means of springs 14 surrounding the bolts.

The tank 1 is mounted for rotation about its axis upon the rollers or wheels 15, 15 carried upon a supporting framework 16. These rolls are grooved and receive the annular rings 17, 17 welded or otherwise secured to the casing 5. A spout 18 projects from one side of the tank and normally occupies the position shown in Fig. 2 during the melting operation. In order to discharge the tank through the spout into the receiving pot 19, the tank is rotated through an angle of about 90 degrees. When the tank is in the position shown in Fig. 2, the spout 18 is closed by means of the cover 20 carried upon the framework 21. There is a slight amount of clearance between the face of the block 20 and the end of the spout, so that the block does not interfere with the spout during the tilting movement of the tank.

Mounted upon the top of the framework 21 is a motor 22 which is used for tilting the tank. This motor drives the shaft 23 through a worm reducer in the casing 24, and the shaft is provided at its ends with the drums 25, 25, to which are secured the cables 26, 26. The ends of the cables 26, 26 are secured to connections 27 attached to the casings 7, 7 of the chamber 3 by means of the beam 45. Batch is fed to the rear end of the chambers 2, 3 and 4 by means of spouts 28 discharging into the passages 29. The upper ends of the spouts are supplied by means of the worm feeders 30 which are supported and supplied with batch in any suitable manner, not shown. Each of the plates 12 is provided with a pivot pin 31 carrying a cover 32 so that when the spouts 28 are moved out of discharging position to permit of the tilting of the tank 1, the covers may be swung over the upper ends of the passages 29.

Mounted in the wall of each of the chambers 2, 3 and 4 is a refractory ring 33 which carries the electrodes for supplying current to the contents of the furnace. The electrodes are in the form of the metal rings 34 carrying the bars 35 which extend through the ring 33 and have their inner ends flush with the inner face of the ring 33. The bars 35 are preferably of tungsten. This metal is particularly desirable, as it has a melting point of about 4500 degrees F., which is far above the melting point of the glass, so that under the heat conditions encountered, the electrodes will last indefinitely and will not discolor the glass. The rings 34 are connected to the three leads 36, 37 and 38 by means of which three phase current is caused to flow through the contents of the chambers 2, 3 and 4 and the melting tank 1, as indicated by the arrows in Fig. 3.

The flow of current reduces the batch supplied through the spouts 28 to molten condition and maintains it in such condition in the tank 1, this melting operation being continued until the glass reaches the level about as indicated in Fig. 2. At such time one of the pots 19 is placed in position and the tank is rotated to fill the pot. This pot is then removed and placed in a pot furnace and another empty pot placed in position to receive a charge of glass from the tank 1. This pot is also filled when the necessary amount of melted glass accumulates in the tank 1. During the tilting and pouring operation, the spouts 28 are moved to one side and the covers 32 are positioned over the openings 29. The tilting operation is accomplished by means of the motors 22 which operate through the shaft 23, the reducing gearing in the casing 24, the drums 25 and the cables 26. When in normal melting position, the I-beam 45, which is secured to the casings 7, 7, 7 rests upon the pair of standards 46.

Fig. 6 illustrates a modification in which the electrodes 39 are located to the rear of the inlet passage 40 instead of in front of such inlet passage, as in the construction of Figs. 1 to 5. In this case, the swinging cover 41 is mounted upon a pivot rod 42 carried by the casing 43 in advance of the spout 44 through which the batch is supplied. In other respects the construction is the same as that of Figs. 1 to 5.

What I claim is:

1. In combination, a glass melting tank mounted for tilting movement about a horizontal axis, provided with a pouring spout, and comprising a collecting chamber and a plurality of reducing chambers extending laterally from one side of the collecting chamber, means for feeding bath into each of the reducing chambers, electrodes in such chambers, means for causing a flow of current between the electrodes through the contents of reducing and collecting chambers to melt the batch and maintain it in molten condition, and means for tilting the tank at intervals to discharge the melted glass which accumulates in the collecting chamber.

2. In combination, a horizontal cylindrical collecting tank mounted for rotation about its horizontal axis, a pouring spout leading from the side of the tank and adapted in one position of rotation of the tank to discharge the contents thereof by gravity, a plurality of reducing chambers extending laterally from the side of the collecting tank, means for supplying batch to said chambers, electrodes in the walls of said chambers and means for supplying current to the electrodes.

3. In combination, a horizontal cylindrical collecting tank mounted for rotation about its horizontal axis, a pouring spout leading from the side of the tank and adapted in one position of rotation of the tank to discharge the contents thereof by gravity, a plurality of reducing chambers extending laterally from the side of the collecting tank, means for supplying batch to the ends of said chambers remote from the tank, electrodes in the walls of said chambers and means for supplying current to the electrodes.

4. In combination in a glass melting apparatus, a reducing chamber of cylindrical cross section having a refractory lining, an annular ring of refractory material constituting a part of said lining, an annular metal ring extending around said refractory ring, a plurality of electrodes connected to the metal ring at their outer ends and extending radially through the refractory ring and terminating at the inner surface thereof, and means for supplying current to the metal ring.

In testimony whereof, I have hereunto subscribed my name this 24th day of February, 1930.

ALFRED L. HARRINGTON.